US012804231B2

(12) United States Patent
Sanford et al.

(10) Patent No.: US 12,804,231 B2
(45) Date of Patent: *Nov. 17, 2026

(54) SYSTEM AND METHOD FOR REMOVING COPYRIGHTED MATERIAL FROM A STREAMING PLATFORM

(71) Applicant: Mux, Inc., San Francisco, CA (US)

(72) Inventors: Justin Sanford, San Francisco, CA (US); Matt Ward, San Francisco, CA (US); Salar Khan, San Francisco, CA (US); Mark Franceschini, San Francisco, CA (US)

(73) Assignee: Mux, Inc., San Francisco, CA (US)

( * ) Notice: Subject to any disclaimer, the term of this patent is extended or adjusted under 35 U.S.C. 154(b) by 22 days.

This patent is subject to a terminal disclaimer.

(21) Appl. No.: 18/968,765

(22) Filed: Dec. 4, 2024

(65) Prior Publication Data

US 2025/0097533 A1 Mar. 20, 2025

Related U.S. Application Data

(63) Continuation of application No. 18/083,220, filed on Dec. 16, 2022, now Pat. No. 12,192,582.

(60) Provisional application No. 63/290,575, filed on Dec. 16, 2021.

(51) Int. Cl.

| | |
|---|---|
| ***H04N 21/4627*** | (2011.01) |
| ***G06V 10/764*** | (2022.01) |
| ***H04N 21/454*** | (2011.01) |

(52) U.S. Cl.

CPC ....... *H04N 21/4627* (2013.01); *G06V 10/764* (2022.01); *H04N 21/454* (2013.01)

(58) Field of Classification Search

CPC ............. H04N 21/4627; H04N 21/454; H04N 21/835; H04N 21/8456; H04N 21/2541; H04N 21/23418; H04N 21/2407; G06V 10/764

See application file for complete search history.

(56) References Cited

U.S. PATENT DOCUMENTS

| | | | | |
|---|---|---|---|---|
| 10,437,965 | B2 * | 10/2019 | Leske | H04N 21/632 |
| 2008/0178302 | A1 * | 7/2008 | Brock | G06F 16/9536<br>726/32 |
| 2015/0302886 | A1 * | 10/2015 | Brock | H04L 63/0263<br>726/32 |

(Continued)

*Primary Examiner* — Chenea Davis

(74) *Attorney, Agent, or Firm* — Run8 Patent Group, LLC; Peter Miller

(57) ABSTRACT

A method including: monitoring a set of streaming metrics for a video stream during a set of time intervals of a first duration during a first time window; in response to a first streaming metric, executing an image classification model based on a set of image frames in the video stream to characterize the image frames according to a set of tags; retrieving a content manifest associated with a content type of the video stream, the content manifest defining a set of target concepts related to the content type; deriving a difference between the set of tags to the set of target concepts in the content manifest to compute a match score for the video stream; in response to the match score exceeding a threshold score, flagging the video stream for manual authentication; and in response to receiving an abuse confirmation from the operator removing the video stream from the streaming platform.

20 Claims, 5 Drawing Sheets

(56) References Cited

U.S. PATENT DOCUMENTS

| | | | | |
|---|---|---|---|---|
| 2017/0357782 | A1 * | 12/2017 | Leske | H04N 21/2541 |
| 2019/0028766 | A1 * | 1/2019 | Wold | G06Q 50/184 |
| 2022/0327322 | A1 * | 10/2022 | Kandpal | G06N 3/08 |

* cited by examiner

SYSTEM AND METHOD FOR REMOVING COPYRIGHTED MATERIAL FROM A STREAMING PLATFORM

CROSS-REFERENCE TO RELATED APPLICATIONS

This Application is a continuation of U.S. patent application Ser. No. 18/083,220, filed on 16 Dec. 2022, which claims the benefit of U.S. Provisional Application No. 63/290,575, filed on 16 Dec. 2021, which is incorporated in its entirety by this reference.

TECHNICAL FIELD

This invention relates generally to the field of internet-based content streaming and more specifically to a new and useful method for removing copyrighted material from a streaming platform in the field of internet-based content streaming.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. First Method

Figure 1:
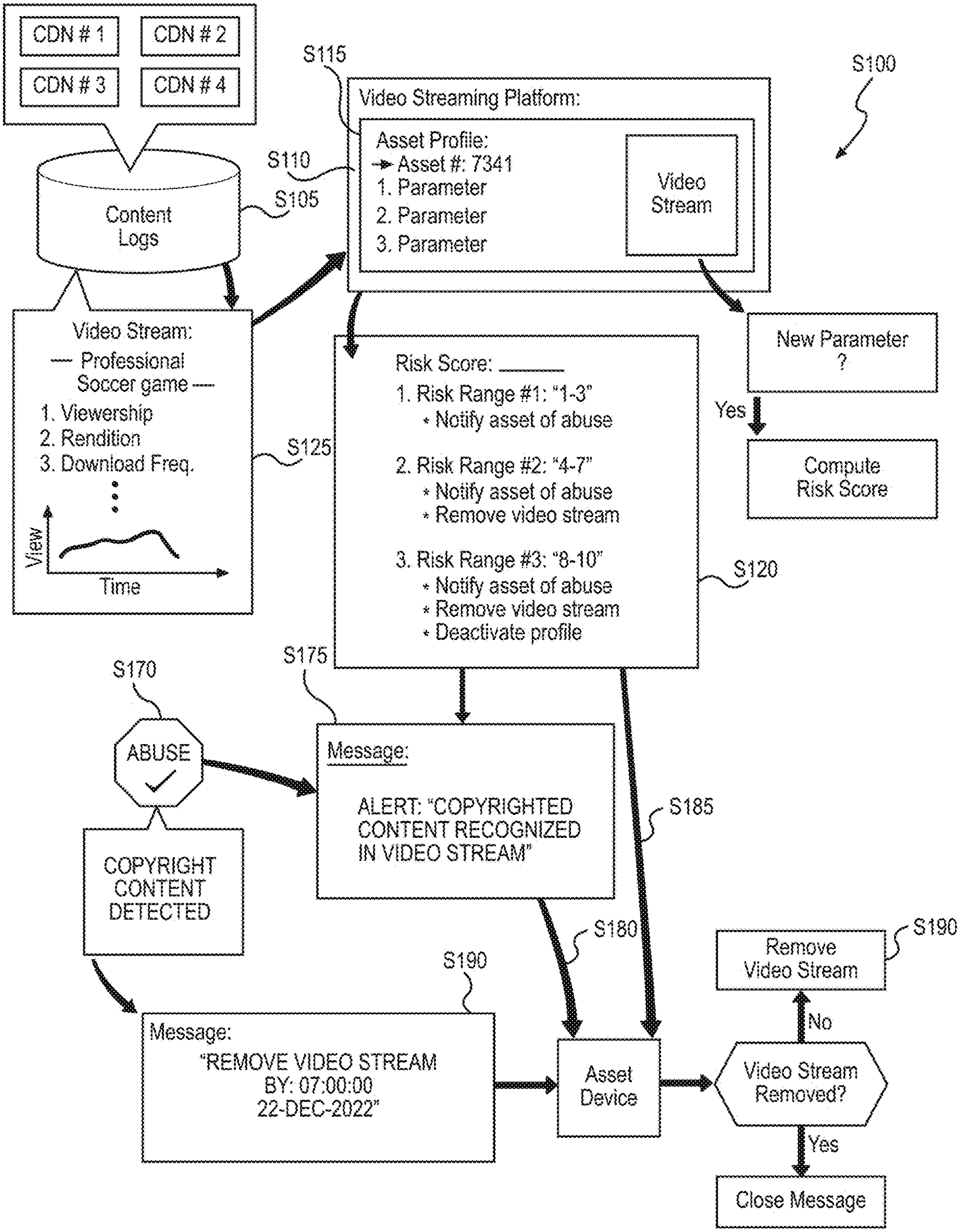
FIG. 1 is a schematic representation of a first method.

As shown in FIG. 1, for a first streaming event at a streaming platform, a first method S100 includes: during a first time period, accessing a set of content logs for a population of CDNs including a set of streaming metrics for a video stream in Block S105; identifying an asset associated with the video stream in Block S110; accessing an asset profile for the asset, the asset profile including a set of profile parameters in Block S115; and computing a first risk score for the asset according to a score range and based on a subset of profile parameters in Block S120.

The first method S100 further includes: during a second time period, monitoring the set of streaming metrics for the video stream during a set of time intervals of a first duration during a first time window in Block S125; in response to a first streaming metric, in the set of streaming metrics, for the first video stream exceeding a threshold metric during the first time window, accessing a conflict log including a set of flagged assets in Block S130; in response to identifying absence of the asset in the conflict log, retrieving the risk score for the asset in Block S135; extracting a set of image frames from the video stream according to an image extraction frequency in Block S140; executing an image classification model based on the set of image frames to characterize the image frames according to a set of tags in Block S145; retrieving a content manifest associated with a content type of the video stream, the content manifest defining a set of target concepts related to the content type in Block S150. The first method S100 further includes: during the second time period, deriving a difference between the set of tags associated with the set of image frames to the set of target concepts in the content manifest to compute a match score for the video stream in Block S155; and, in response to the match score exceeding a threshold score in Block S160, flagging the video stream for manual authentication, and delivering the video stream to an interface associated with an operator in Block S165. The first method S100 further includes: during the second time period, in response to receiving an abuse confirmation for the video stream from the operator in Block S170, generating a notification to the asset descriptive of the abuse confirmation in Block S175, transmitting the notification to the asset in Block S180, and performing an action on the first asset profile based on the risk score for the asset in Block S185.

1.1 Variation: Monitoring Viewership Metrics

As shown in FIG. 1, one variation of the method S100 for a first streaming event at a streaming platform includes: during a first time period, accessing a set of content logs for a population of CDNs including a set of viewership metrics for a video stream in Block S105; identifying an asset associated with the video stream in Block S110; accessing an asset profile for the asset, the asset profile including a set of profile parameters in Block S115; and computing a first risk score for the asset according to a score range and based on a subset of profile parameters in Block S120.

This variation of the method S100 further includes: during a second time period, monitoring the set of viewership metrics for the video stream during a set of time intervals of a first duration during a first time window in Block S125; in response to a first viewership metric, in the set of viewership metrics, for the first video stream exceeding a threshold metric during the first time window, accessing a conflict log including a set of flagged assets in Block S130; in response to identifying absence of the asset in the conflict log, retrieving the risk score for the asset in Block S135; extracting a set of image frames from the video stream according to an image extraction frequency based on the risk score for the asset; executing an image classification model based on the set of image frames to characterize the image frames according to a set of tags in Block S140; and retrieving a content manifest associated with a content type of the video stream, the content manifest defining a set of target concepts related to the content type in Block S150. This variation of the method S100 further includes: during the second time period, deriving a difference between the set of tags associated with the set of image frames to the set of target concepts in the content manifest to compute a match score for the video stream in Block S155; in response to the match score exceeding a threshold score in Block S160, delivering the video stream to an interface associated with an operator for manual authentication in Block S165; in response to receiving a confirmation, from the operator, indicating presence of copyrighted content in the video stream in Block S170, generating a notification descriptive of the abuse confirmation in Block S175; transmitting the notification to the asset in Block S180; and removing the video steam from the streaming platform in Block S185.

1.2 Variation: Instructing Content Removal

As shown in FIG. 1, another variation of the method S100 for a first streaming event at a streaming platform includes: during a first time period, identifying an asset associated with a first streaming event of a video stream via a streaming platform in Block S110; accessing an asset profile for the asset, the asset profile including a set of profile parameters; in Block S115 and computing a first risk score for the asset according to a score range and based on a subset of profile parameters in Block S120.

This variation of the method S100 further includes: during a second time period, monitoring the set of viewership metrics for the video stream during a set of time intervals of a first duration during a first time window in Block S125; in response to a first viewership metric, in the set of viewership metrics, for the first video stream exceeding a threshold metric during the first time window, retrieving the risk score for the asset in Block S135; extracting a set of image frames from the video stream according to an image extraction frequency based on the risk score for the asset in Block S140; characterizing the image frames according to a set of tags based on an images classification model in Block S140; and retrieving a content manifest associated with a content type of the video stream, the content manifest defining a set of target concepts related to the content type in Block S150. This variation of the method S100 further includes: during the second time period, deriving a difference between the set of tags associated with the set of image frames to the set of target concepts in the content manifest to compute a match score for the video stream in Block S155; in response to the match score exceeding a threshold score, delivering the video stream to an interface associated with an operator for manual authentication in Block S160; and, in response to receiving a confirmation, from the operator, indicating presence of copyrighted content in the video stream in Block S170, generating a notification to the asset instructing removal of the video stream within a first time period in Block S190, transmitting the notification to the asset, and in response to detecting failure to remove the video stream within the first time period, automatically removing the video steam from the streaming platform in Block S195.

2. Applications

Generally, the computer system can execute Blocks of method S100 to: compute risk scores for an asset associated with a streaming event of a audio-visual content via a streaming platform; monitor streaming metrics for the streaming event; responsive to detecting an increase in a viewing rate of the audio-visual content via the streaming platform, characterizing the audio-visual content to identify presence of copyrighted content; responsive to identifying presence of copyrighted content in the audio-visual content, prompting manual authentication of the audio-visual content by an operator; and, in response to receiving an abuse confirmation from the operator, notifying the asset of the abuse, and removing the audio-visual content from the streaming platform.

Figure 2:
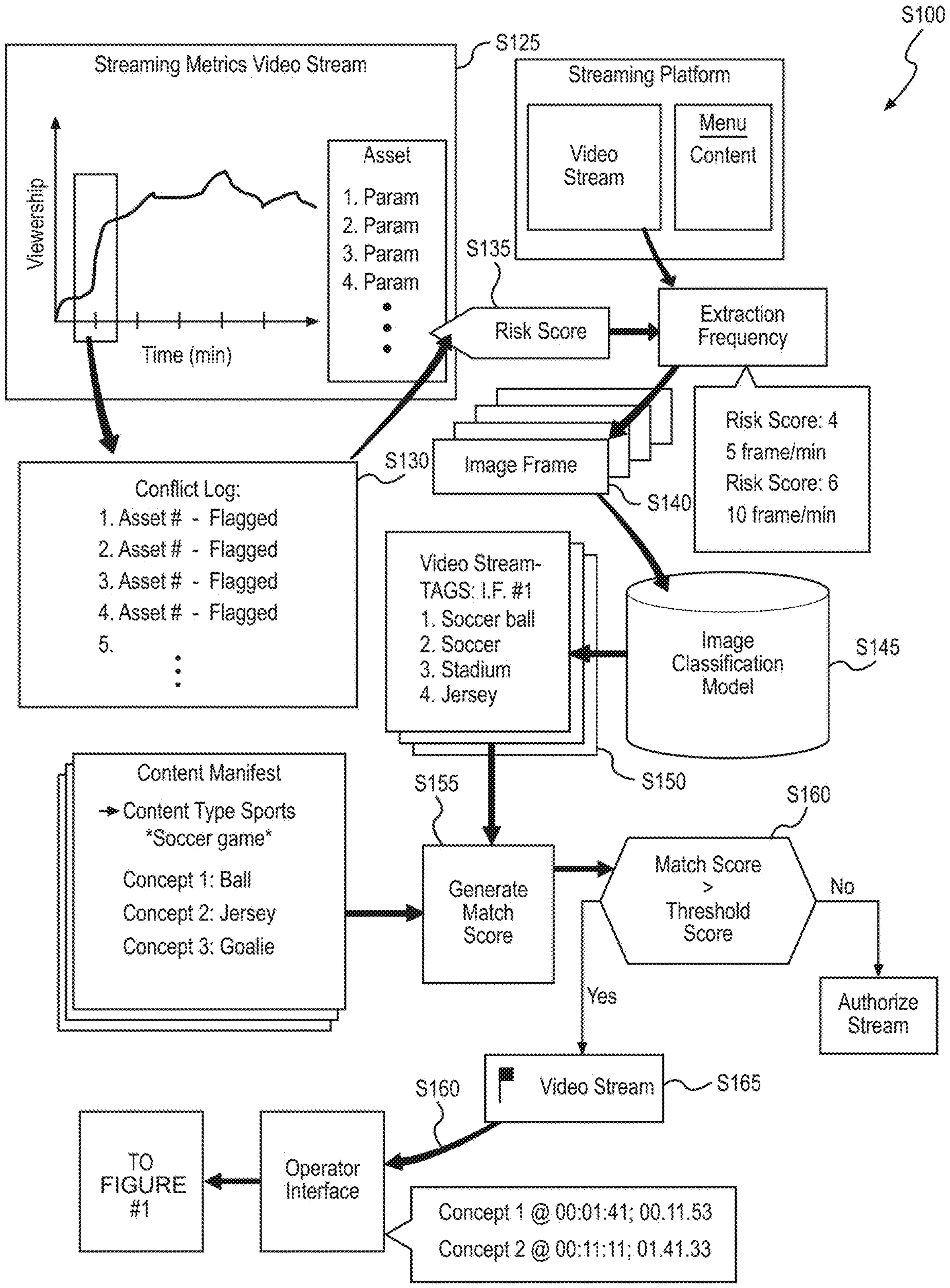
FIG. 2 is a schematic representation of one variation of the first method.
Figure 3:
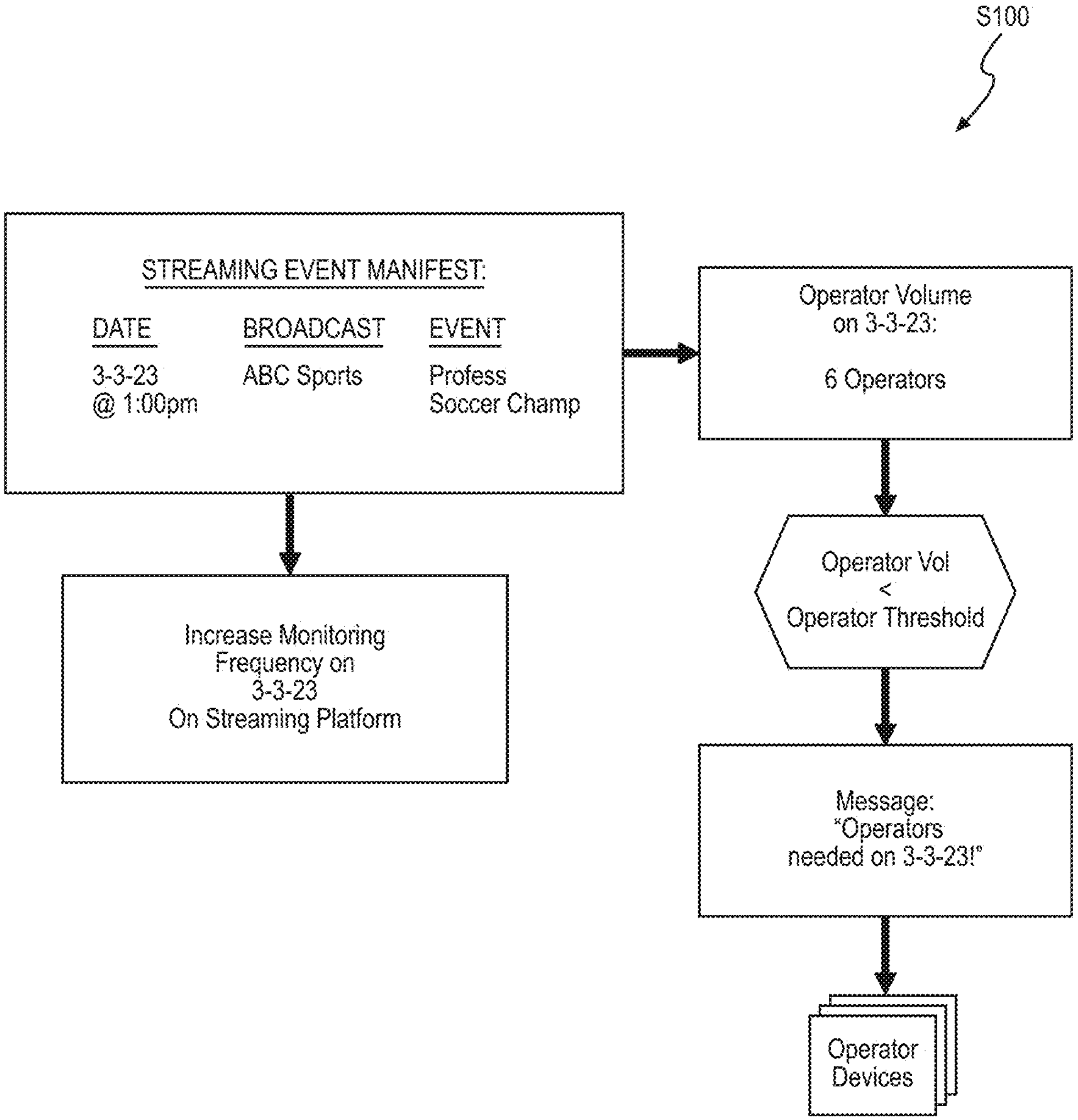
FIG. 3 is a schematic representation of one variation of the first method.

As shown in FIGS. 1-3, a computer system can execute Blocks of the method S100 to autonomously or semi-autonomously identify, characterize, and/or remove copyrighted audiovisual (hereafter "AV") content from a streaming platform. For example, the streaming platform can include a set of content distribution networks (hereafter "CDNs") in communication with the computer system and a set of assets (e.g., viewers, content creators). In this example, the computer system can distribute AV content-transmitted through the CDNs—to a set of user devices (e.g., computer, laptop, tablet, smartphone).

2.1 Example: Streaming Metrics

In one implementation, during a first time period, the computer system can access a set of CDN logs to identify streaming metrics for a population of CDNs in communication with the computer system and the streaming platform. For example, the computer system can access the set of content logs including a set of streaming metrics for a video stream, such as: a set of viewership metrics (e.g., number of viewers for a streaming event, a timeseries of viewership counts for a duration of the video stream). Thus, the computer system can: monitor changes in viewing metrics; and prompt investigation of video streams when the computer system identifies anomalies in the streaming metrics, such as when viewership for a video stream increases at a rate that exceeds a threshold rate.

2.2 Example: Asset Characterization

In one implementation, the computer system can characterize an asset associated with the video stream. For example, the computer system can: identify an asset (e.g., a content streamer, a content creator) associated with the video stream; and access an asset profile for the asset including a set of profile parameters. In this example, the computer system can compute a risk score for the asset based on the profile parameters. More specifically, the risk score can specify a likelihood of abuse of AV content by the asset, such as streaming pirated copyrighted content via the streaming platform. For example, for a first asset profile, the computer system can: identify a first email associated with the asset profile including a domain name indicating a temporary service type; identify an absent payment for the asset profile (e.g., for a subscription to the streaming platform); and detect a date of creation of the profile within a threshold time period (e.g., with the last 48 hours). In this example, the computer system can compute a first risk score (e.g., "8") indicating that the first asset profile is likely to be associated with a stream of unauthorized content and removed from the streaming platform.

2.3 Example: Video Stream Characterization

In one implementation, the computer system characterizes the video stream to identify presence of copyrighted content. For example, during a second time period, the computer system can detect that a streaming metric for the video stream exceeds a threshold metric. The computer system can then access a conflict log including a set of flagged assets to identify whether the computer system has previously flagged the asset for streaming copyrighted content. In response to identifying absence of the asset in the conflict log, the computer system can retrieve the risk score for the asset. In this example, the computer system can extract a set of image frames from the video stream according to an image extraction frequency. More specifically, the image extraction frequency (e.g., image frames per minute) can be based on the risk score associated with the asset. For example, for a first asset characterized by a first risk score (e.g., "2"), the computer system can extract a first set of image frames according to a first image extraction frequency (e.g., 1 image frame per minute). In another example, for a second asset characterized by a second risk score higher than the first risk score (e.g., "9"), the computer system can extract a second set of image frames according to a second image extraction frequency—higher than the first image extraction frequency—(e.g., 1 image frame every 15 seconds). The computer system can then execute an image classification model based on the set of image frames to characterize the image frames according to a set of tags, such as: "soccer ball"; "red jersey"; "flag"; and/or "goalie." Therefore, the computer system can compare the set of tags to a set of target concepts to compute a match score for the video stream signifying a resemblance of the video stream content to audiovisual content likely to be copyrighted.

2.4 Example: Manual Authentication

In one implementation, the computer system can prompt manual authentication of the video stream based on the match score. More specifically, in response to the match score exceeding a threshold score, the computer system can: flag the video stream for manual authentication; and deliver the video stream to an interface associated with an operator. In one variation, the computer system can prompt multiple authentication cycles by a set of operators. Thus, the computer system can trigger authentication of the video stream by the operator to verify abuse of copyrighted material.

2.5 Example: Risk Score-Based Response

In one implementation, the computer system can perform an action on the asset profile based on the risk score for the asset. For example, in response to receiving an abuse confirmation for the video stream from the operator, the computer system can: generate a notification to the asset descriptive of the abuse confirmation; transmit the notification to the asset; and perform an action on the first asset profile according to the risk score for the asset. For example, responsive to identifying a second risk score for the asset within the second range (e.g., "4"-"7"), the computer system can: notify the asset of the abuse detection via a notification; and remove the video stream from the viewing platform. In another example, responsive to identifying a third risk score for the asset within the third range (e.g., "8"-"10"), the computer system can: notify the asset of the abuse detection via a notification; remove the video stream from the viewing platform; and deactivate the asset profile associated with the asset. Therefore, the computer system can proactively remove copyrighted content from the streaming platform when the risk score for the asset indicates high likelihood of abuse or suspicion.

3. CDN Log Data

In one implementation, the computer system can access a set of CDN logs to identify streaming metrics for a population of CDNs in communication with the computer system and the streaming platform. For example, the computer system can access a set of content logs (e.g., CDN logs) for a population of CDNs. In this example, the computer system can access the set of content logs including a set of streaming metrics for a video stream, such as: a set of viewership metrics (e.g., number of viewers for a streaming event); a streaming quality (e.g., a rendition); geographic patterns; streaming errors (e.g., buffering events); a content download type (e.g., a soccer game); a content download frequency, an asset profile access frequency, etc. More specifically, the viewership metric can include a timeseries of viewership counts for a duration of the video stream (e.g., 565 viewers at 00:04:30, 601 viewers at 00:05:01). Thus, the computer system can: identify changes in streaming metrics; and prompt investigation of video streams when the computer system identifies anomalies in the streaming metrics and/or when changes in streaming metrics exceed metric thresholds.

4. Asset Identification+Profile

In one implementation, the computer system can: identify an asset associated with a streaming event, and a profile for the asset. For example, the computer system can detect a streaming event of a video stream (e.g., AV content) via the streaming platform. In this example, the video stream can be: a pirated broadcast of a sporting event (e.g., a soccer game); a stream of copyrighted material (e.g., a film, a music video); a livestream of online course, etc. The computer system can then identify an asset associated with the streaming event, such as: a viewer; a streaming entity (e.g., a sports broadcasting network); a content streamer; and/or a content creator subscribed to the streaming platform. The computer system can then access an asset profile (or account) associated with the asset. For example, the computer system can access the asset profile including profile parameters, such as: a location (e.g., a city, a country); an email address; a date of profile creation (e.g., a profile age); a historical profile log; a payment history; a set of referrers to the streaming platform; a set of followers (e.g., profile subscribers); and/or an average viewership metric for streaming events. Thus, the computer system can compute a risk score for the asset indicating a legitimacy of the asset based on the profile parameters.

5. Risk Score Computation

In one implementation, the computer system can compute a risk score for the asset based on a set of profile parameters. More specifically, the computer system can compute the risk score specifying a likelihood of abuse of AV content by the asset (or legitimacy of the asset) via the streaming platform. For example, the computer system can access a subset of profile parameters associated with the asset profile such as: a geography; an age of the profile; a payment status; a payment history; a set of profile referrers; and/or a set of email address characteristics. More specifically, the set of email parameters can include: an email service type (e.g., a free email service, a temporary email); a username structure (e.g., "foo+tmp@"); a symbol or character (e.g., "$"); and/or email behavior (e.g., auto-fill functionality duplicating the address in the two address fields). In one variation, the computer system can compute the risk score for the asset during an onboarding process for the asset (e.g., upon profile creation). Thus, the computer system can generate the risk score for the asset profile based on a subset of profile parameters.

In one implementation, the computer system can compute the risk score based on a subset of profile parameters according to a score range, such as: between "0"-"10," or between "0"-"1". More specifically, the computer system can: compute a lower risk score—relative to the score range—for an asset profile exhibiting a higher likelihood of legitimacy based on the subset of profile parameters; and compute a higher risk score—relative to the score range—for an asset profile exhibiting a higher likelihood (or risk) of abuse (e.g., streaming pirated or copyrighted AV content). For example, for a first asset profile, the computer system can: identify a first email associated with the asset profile including a domain name indicating a temporary service type; identify an absent payment for the asset profile (e.g., for a subscription to the streaming platform); and detect a date of creation of the profile within a threshold time period (e.g., with the last 48 hours). In this example, the computer system can compute a first risk score (e.g., "8") indicating that the first asset profile is likely to be associated with a stream of blacklisted content (e.g., copyrighted) and removed from the streaming platform. In another example, for a second asset profile, the computer system can: identify a payment profile for the asset profile; access a referrer blacklist including a set of flagged (e.g., banned, removed) referring assets on the streaming platform; identify absence of a set of referrers associated with the second asset profile in the referrer blacklist; and detect a second date of creation of the profile exceeding the threshold time period (e.g., a year). In this example, the computer system can compute a second risk score (e.g., "2") indicating that the second asset profile is likely to be associated with a complaint or legitimate asset. In one variation, the computer system can compute the risk score based on a weighted combination of a subset of profile parameters. For example, the computer system can assign a weight to each profile parameter according to a significance level, such as: a first weight to a profile geography, and a second weight—higher than the first weight—to an age associated with the asset profile.

In one implementation, the computer system can periodically compute a risk score for the asset. For example, during an onboarding process for the first asset, the computer system can compute a first risk score for the asset profile based on a first set of profile parameters. As the computer system receives profile parameters (e.g., detects an increase in referrers, detects an increase in payment history), the computer system can iteratively compute the risk score for the asset profile. In another example, the computer system can compute the risk score for the asset responsive to detecting a change in a profile parameter. For example, responsive to identifying a change in an email address associated with the asset profile from a first email address to a second email address, the computer system can update the risk score for the asset by computing a second risk score based on the subset of profile parameters and the second email address. Thus, the computer system can accurately characterize an asset profile as the computer system receives profile parameters and identifies changes in profile parameters. Therefore, the computer system can assign the risk score to the asset; and automate responses to abuse detection based on the risk score.

6. Viewership Monitoring

In one implementation, the computer system can monitor the video stream associated with a streaming event to detect a change in viewership metrics. For example, during a first time period, the computer system can identify a first viewership metric (e.g., 100 viewers) for the video stream based on the content log; and monitor the viewership metrics for the video stream during a set of time intervals of a first duration during a first time window to detect a change in the viewership metrics. For example, the computer system can monitor the viewership metric for the video stream every 10 minutes to identify an increase in the viewership metrics (e.g., 1,500 viewers) during the last 20 minutes. In this example, in response to the viewership metric for the video stream exceeding a viewership threshold during the first time window, the computer system can flag the video stream for investigation. More specifically, the computer system can detect an increase in a viewing rate of the video stream via the viewing platform. Therefore, responsive to detecting an increase in a viewing rate of a video stream that exceeds a viewing rate threshold, the computer system can prompt investigation of the video stream to detect abuse of AV content, such as an increase in viewership due to an illegal video stream of copyrighted content.

In one variation, the computer system can prompt investigation of a video stream (e.g., extraction and classification of image frames) to detect abuse of AV content in response to detecting the viewing rate of the video stream falling below the viewing rate threshold. Thus, the computer system can proactively prevent dissemination of copyrighted AV content even when the computer system identifies viewership metrics for the video stream falling below a viewership metric threshold.

7. Conflict Log Verification

In one implementation, the computer system can query a conflict log to detect whether the computer system has flagged the asset associated with the streaming event of the video stream for abuse of AV content. For example, in response to the viewership metric for the video stream exceeding a viewership threshold during the time period, the computer system can access a conflict log including a set of flagged assets. More specifically, the conflict log can include a set of assets previously flagged for streaming pirated copyright content. The computer system can then: query the conflict log; and, in response to identifying absence of the first asset in the conflict log, retrieve the risk score for the first asset. For example, in response to identifying the first asset in the conflict log, the computer system can: identify the profile associated with the first asset; and automatically deactivate the asset profile to prevent the first streaming event of the video stream via the streaming platform. Therefore, the computer system can reduce computational expenditures in characterizing the video content of the video stream and prompting manual investigation of an asset when the computer system previously detected abuse of AV content by the asset.

8. Image Extraction+Video Content Characterization

In one implementation, the computer system can extract image frames from the video stream to characterize the AV content of the video stream. For example, during a second time, the computer system can extract a set of image frames from the video stream according to an image extraction frequency. More specifically, the image extraction frequency (e.g., image frames per minute) can be based on the risk score associated with the asset. For example, for a first asset characterized by a first risk score (e.g., "2"), the computer system can extract a first set of image frames according to a first image extraction frequency (e.g., 1 image frame per minute). In another example, for a second asset characterized by a second risk score higher than the first risk score (e.g., "9"), the computer system can extract a second set of image frames according to a second image extraction frequency—higher than the first image extraction frequency—(e.g., 1 image frame every 15 seconds). In one variation, the computer system can label each image frame in the set of images with a timestamp according to the video stream.

In one implementation, the computer system can execute an image classification model to label the set of image frames. For example, the computer system can: access an image classification model; and execute the image classification model based on the set of image frames to characterize the image frames according to a set of tags (or labels). More specifically, in response to executing the image classification model based on the set of image frames, the computer system can characterize each image frame in the set of image frames according to a set of tags. For example, for a streaming event of a soccer game, the system can: extract a set of 10 image frames from the video stream of the soccer event; and execute the image classification model based on the set of 10 image frames to generate a set of tags for each image frame descriptive of content in each image frame. In this example, for a first image frame, a first set of tags can include: "soccer ball"; "red jersey"; "flag"; and/or "goalie." In this example, for a second image frame, a second set of tags can include: "soccer ball"; "field"; and/or "stadium". Thus, the computer system can characterize the AV content of the video stream to identify copyrighted content in the video stream.

8.1 Content Manifest+Authentication Trigger

In one implementation, the computer system can retrieve a content manifest; and compare the set of tags for each image frame to the content manifest to trigger manual authentication of the video stream. For example, the computer system can: identify a content type (or category) of the video stream; and retrieve a content manifest associated with the content type. In this example, the content type can include: a sport (e.g., soccer); cinema content (e.g., a film, a sitcom); an event (e.g., an awards show, a parade), etc. More specifically, each content manifest can define a set of target concepts related to the content type. For example, in response to identifying a "soccer" content type for the video stream, the computer system can retrieve a content manifest defining a set of target concepts, such as: "soccer ball"; "field"; and/or "jersey." Therefore, the computer system can compare the tags associated with the image frames and the target concepts to prompt manual authentication of copyright content in the video stream.

In one implementation, the computer system can: compute a match score for the video stream; and flag the video stream for manual authentication based on the match score. For example, the computer system can compare the set of tags associated with the set of image frames with the set of target concepts according to the content manifest to compute a match score for the video stream. In this example, the computer system can compute the match score based on (e.g., proportional to) a number of matches between the set of tags associated with the set of image frames and the set of target concepts in the content manifest. In response to the match score exceeding a threshold score, the computer system can: flag the video stream for manual authentication; and deliver the video stream to an operator for authentication. More specifically, the computer system can transmit the set of tags and the set of target concepts for the set of image frames, including the set of timestamps associated with the set of image frames, to an interface associated with the operator. Therefore, the computer system can trigger authentication of the video stream by the operator to verify abuse of copyrighted material.

9. Abuse Confirmation+Iterative Authentication

In one implementation, the computer system can trigger authentication of the video stream by an operator to verify presence of copyrighted content in the video stream. For example, the computer system can generate a set of instructions for the operator to confirm presence of copyrighted content in the video stream based on the target concepts at the timestamps associated with each image frame in the set of image frames. In this example, the computer system can generate the set of instructions including: verification of AV content in the video stream at the timestamps specified by the set of image frames; viewing a portion of the video stream to identify copyrighted content; identifying a set of copyright indicators, such as: "©," "all rights reserved," "copyright," "work," "performance," "broadcast," etc. Thus, the computer system can prompt manual confirmation of presence of copyrighted AV content in the video stream.

In one implementation, the computer system can prompt a set of authentication cycles for the video stream. More specifically, based on the risk score associated with the asset, the computer system can prompt authentication of the video stream to confirm presence of copyrighted content in the video stream by a set of operators. For example, responsive to the risk score (e.g., "8") for the first asset associated with the video stream exceeding a risk threshold (e.g., "6"), the computer system can prompt authentication of the video stream by two or more operators. In this example, for each instance that the computer system delivers the video stream to a subsequent operator, the computer system can trigger authentication of the video stream according to a greater degree (or level) of content specificity. For example, for a streaming event of the soccer game, the computer system can prompt a first operator to verify presence of AV content according to a first set of target concepts based on a first content manifest, including: "soccer"; "jersey"; "field"; "soccer ball." In this example, responsive to the first operator confirming presence of the first set of target concepts in the video stream, the computer system can: deliver the video stream to a second operator; and prompt the second operator to verify presence of AV content according to a second set of target concepts based on a second content manifest, including: a team logo; a team captain; a sports broadcasting network logo, etc. Responsive to the second operator confirming presence of the second set of target concepts in the video stream, the computer system can: receive an abuse indication (e.g., a notification, a confirmation) specifying presence of copyrighted content in the video stream; and trigger a response to remove the video stream. In one variation, responsive an operator confirming presence of copyrighted content in the video stream, the computer system can prompt the operator to submit a reason for the abuse indication, such as: "Copyrighted Content Identified"; "Exceeds Viewing Threshold"; and/or "Includes Restricted Content." Therefore, by prompting multiple cycles of authentication, the computer system can increase accuracy in detecting copyrighted material and removing copyrighted material from the streaming platform.

10. Risk Score-Based Response

In one implementation, the computer system can: receive an abuse confirmation for the video stream; and perform an action based on the risk score associated with the asset. For example, in response to receiving an abuse confirmation for the video stream from the operator, the computer system can: generate a notification descriptive of the abuse confirmation; and transmit the notification to the asset. In this example, the computer system can generate a generic notification, such as: "Content Issue"; "Video Stream Error." In another example, the computer system can generate a notification based on the type of copyrighted content and/or the reason for the abuse indication, such as: "Professional Soccer Identified."

In one implementation, in response to receiving the abuse confirmation for the video stream, the computer system can perform an action on the video stream (or asset profile) based on the risk score for the first asset. For example, the computer system can correlate a range of risk scores to actions for the streaming event. More specifically, the computer system can: correlate a first range of risk scores with a first action; correlate a second range of risk scores with a second action; correlate a third range of risk scores with a third action; etc. For example, responsive to identifying a risk score for the asset within the first range (e.g., "1"-"3"), the computer system can: notify the asset of the abuse detection via a notification; and generate a recommendation to terminate the first streaming event, and remove the video stream from the streaming platform. In another example, responsive to identifying a second risk score for the asset within the second range (e.g., "4"-"7"), the computer system can: notify the asset of the abuse detection via a notification; and remove the video stream from the viewing platform. In yet another example, responsive to identifying a third risk score for the asset within the third range (e.g., "8"-"10"), the computer system can: notify the asset of the abuse detection via a notification; remove the video stream from the viewing platform; and deactivate the asset profile associated with the asset. Therefore, the computer system can proactively remove copyrighted content from the streaming platform when the risk score for the asset indicates high likelihood of abuse or suspicion.

10.1 Content Removal Notice

In one implementation, responsive to receiving an abuse confirmation from the operator, the computer system can instruct the asset to remove the video stream from the streaming platform. For example, in response to receiving a confirmation, from the operator, indicating presence of copyrighted content in the video stream, the computer system can: generate a notification instructing removal of the video stream from the streaming platform within a first time period (e.g., 10 hours); transmit the notification to the asset; and, in response to detecting failure to remove the video stream by the asset within the first time period, automatically remove the video steam from the streaming platform. In this example, in response to detecting removal of the video stream from the streaming platform within the first time period, closing the notification. Thus, the computer system can reduce computational expenditures in removing copyrighted content by offloading content removal from the streaming platform to the asset associated with the video stream.

10.2 Asset-Based Response

In one implementation, the computer system can perform an action on the video stream (or asset profile) based on a type of asset associated with the video stream. For example, responsive to receiving the abuse confirmation for the video stream, the computer system can identify a type of asset associated with the video stream, such as: an individual (e.g., a content creator); and/or an entity (e.g., a business, a university). In this example, responsive to identifying a first asset as a streaming customer with a first set of asset profile followers (e.g., 10,000), such as a media company, the computer system can: notify the first asset of the abuse confirmation via a notification; and withhold deactivation (or shutting down) of the set of asset profiles associated with the first asset. In another example, responsive to identifying a second asset as an individual streamer, the computer system can: terminate the video stream; remove the video stream from the streaming platform; and withhold deactivation of the asset profile. Therefore, the computer system can reduce complications in professional relationships with larger entities when the computer system detects streaming events including copyrighted content associated with the larger entities.

11. Event Manifest+Dynamic Monitoring Adjustment

In one implementation, the computer system can autonomously change monitoring parameters based on a type of streaming event. For example, the computer system can access a streaming event manifest defining a schedule of upcoming target events (or event broadcasts), such as: a sporting event (e.g., a professional tennis match); a release of cinematic content (e.g., a digital premier for a film, a release of a film trailer); etc. In another example, the computer system can: access a set of broadcasting schedules for a set of entities; and aggregate the set of broadcasting schedules into a streaming event manifest. In this example, the set of entities can include: a set of broadcasting networks; a set of sports channels; a set of live streaming services; etc. Thus, the computer system can reduce computational expenditures associated with copyright content monitoring during a time period when the computer system detects absence of an upcoming target event in the streaming event manifest.

In one implementation, the computer system can dynamically adjust a monitoring frequency of video streams and asset activity on the streaming platform in response to identifying a video stream of an upcoming event. More specifically, the computer system can automatically increase the monitoring frequency of video streams on the video platform in response to identifying broadcast of the event within a first time period according to the streaming event manifest. For example, based on the streaming event manifest, the computer system can detect an upcoming broadcast of a professional soccer championship via a sports broadcasting network within a 24-hour period. In response to expiration of the first time period, the computer system can: reduce the duration of a set of time intervals (e.g., 4-minute monitoring intervals); and monitor viewership metrics of video streams based on the set of time intervals to detect a change (e.g., sudden increase) in the viewership metrics for a video stream associated with an asset. In one variation, the computer system can increase viewership metric monitoring frequency for a set of assets characterized by a risk score exceeding a threshold risk score. For example, in response to detecting an upcoming broadcast of a professional soccer championship via a sports broadcasting network within the 24-hour period, the computer system can: identify a set of assets associated with risk scores exceeding a threshold risk score (e.g., "6"); and increase the viewership metric monitoring frequency for the set of assets. Thus, the computer system can prioritize monitoring video streams for presence of copyrighted content associated with assets characterized by a high likelihood of abuse.

In one implementation, the computer system can monitor profile parameters of asset profiles in response to identifying broadcast of a target event within a first time period based on the streaming event manifest. For example, based on the streaming event manifest, the computer system can detect an upcoming broadcast of a professional racing event via a sports broadcasting network within a 48-hour period. The computer system can then detect changes in profile parameters for a set of assets associated with the streaming platform, such as: an increase in subscribers (or followers) to the asset profile within the 48-hour period; a change in an email address for the asset profile; a change in location (or geography) associated with the asset profile and/or creation of a set of asset profiles during the 48-hour period. Thus, the computer system can proactively monitor assets to identify changes in corresponding asset profiles suggesting potential abuse when the computer system identifies an upcoming broadcast of a target event.

In one implementation, the computer system can dynamically adjust an operator demand in response to identifying broadcast of the target event at a first time. For example, based on the streaming event manifest, the computer system can detect an upcoming broadcast of an awards show via a broadcasting network at a target time (e.g., 12 Oct. 2023 at 15:00:00). The computer system can then access a first (e.g., projected) operator volume at the target time and a time period after the target time (e.g., 24 hours after the broadcast of the target event); and, in response to the first operator volume falling below a threshold operator volume for the target time, and a time period after the target time, generating a notification to increase the first operator volume, and transmitting the notification to a set of operators. Therefore, the computer system can automatically recruit additional operators to authenticate video streams when the computer system identifies an upcoming event according to the streaming event manifest, thereby increasing accuracy in detecting copyrighted content in the video streams.

In one implementation, the computer system can withhold monitoring of a video stream responsive to characterizing the video stream with a low likelihood of abuse. For example, for a first streaming event of a video stream, the computer system can: access a risk score for the asset associated with the video stream; identify the content type for the video stream as a livestream of an asset (e.g., a vlog); and characterize the livestream with a low likelihood of abuse based on the risk score and the content type. In this example, responsive to characterizing the livestream with a low likelihood of abuse, the computer system can withhold (or reduce) monitoring to the video stream for copyrighted content. Thus, the computer system can reduce costs and computational expenditures associated with monitoring video streams for presence of copyrighted content when the video streams exhibit low likelihood of including copyrighted content.

12. Domain Blacklist

In one implementation, the computer system can generate a domain blacklist including a set of domains associated with assets to prevent distribution of video streams from the set of domains to viewers on the streaming platform. For example, during manual authentication of the video stream by an operator, the computer system can: receive an indication from the operator that a first domain (e.g., www.XYZ-.com) is associated with streaming copyrighted content via the streaming platform; and flag the domain. More specifically, the computer system can block the domain from distributing a video stream to assets on the streaming platform, such as: viewers; subscribers; and/or customers. The computer system can then report the domain to the asset. In response to blocking the domain at a blocking frequency exceeding a blocking frequency threshold, the computer system can automatically append the domain to the domain blacklist. Thus, the computer system can monitor domains that frequently distribute copyrighted content to viewers on the streaming platform.

13. Blacklist

Generally, the computer system can prevent delivery of video streams to a set of web-based destinations associated with a set of content consumers (or viewers). In one implementation, the computer system can access a destination blacklist including a set of URLs linked to a set of content viewers associated with the streaming platform. More specifically, the destination blacklist can include: a first URL associated with a first content viewer; a second URL associated with a second content viewer; and/or a third URL associated with a third content viewer. For example, responsive to receiving the abuse confirmation for the video stream associated with the asset, the computer system can: access the content log to identify a set of viewers streaming (or viewing) the video stream via the streaming platform. In this example, based on the content log, the computer system can identify streaming of the video stream by the first content viewer at the first URL, and the second content viewer at the second URL. In this example, the computer system can identify that the first content viewer and the second content viewer follow (e.g., are subscribed to) the asset profile associated with the asset. The computer system can then block delivery of the video stream to the first URL and the second URL. Therefore, the computer system can increase accuracy in abuse detection and removal of copyrighted content by: a) preventing distribution of copyrighted content by assets; and b) preventing reception of the copyrighted content by content consumers.

14 Content Prioritization

In one implementation, the computer system can prioritize removal of copyrighted content based on a content type. More specifically, the computer system can define a target content type as: a sport; a team; an event; etc. For example, during a first time period, the computer system can prioritize identification of video streams on the streaming platform including a first content type; and, during a second time period, prioritize identification of video streams on the streaming platform including a second content type. In this example, a time period can be: a set of days; a meteorological season (e.g., Spring); an athletic season (e.g., a soccer season); a month; a championship period (e.g., a World Cup). Thus, the computer system can prioritize removal of copyrighted content according to a relevant time period for the content type, thereby allocating a greater resource expenditure to identifying and removing content of the target content type.

15. Post-hoc Verification

In one implementation, the computer system can verify removal of the video stream from the streaming platform responsive to receiving a notice from a copyright holder associated with the video stream. For example, during a third time period, the computer system can receive a notice from a copyright holder associated with the video stream reporting unauthorized activity (e.g., streaming) of the video stream via the streaming platform. In this example, the notice can specify an asset associated with the unauthorized activity. The computer system can then access an asset content log defining streaming activity by the asset. For example, the asset content log can include asset activity, such as: a time associated with a video stream; a title of the video stream; a duration of the video stream on the streaming platform; and/or a video stream status (e.g., "active," "removed"). In this example, the computer system can query the asset content log to identify the video stream specified by the notice. In response to detecting absence of the video stream in the asset content log, the computer system can: verify removal of the video stream from the streaming platform, generate a response for the notice indicating removal of the video stream from the streaming platform, and deliver the response to the copyright holder. Therefore, the computer system can verify removal of the copyrighted content upon notice from a copyright holder.

16. Second and Third Methods

Figure 4:
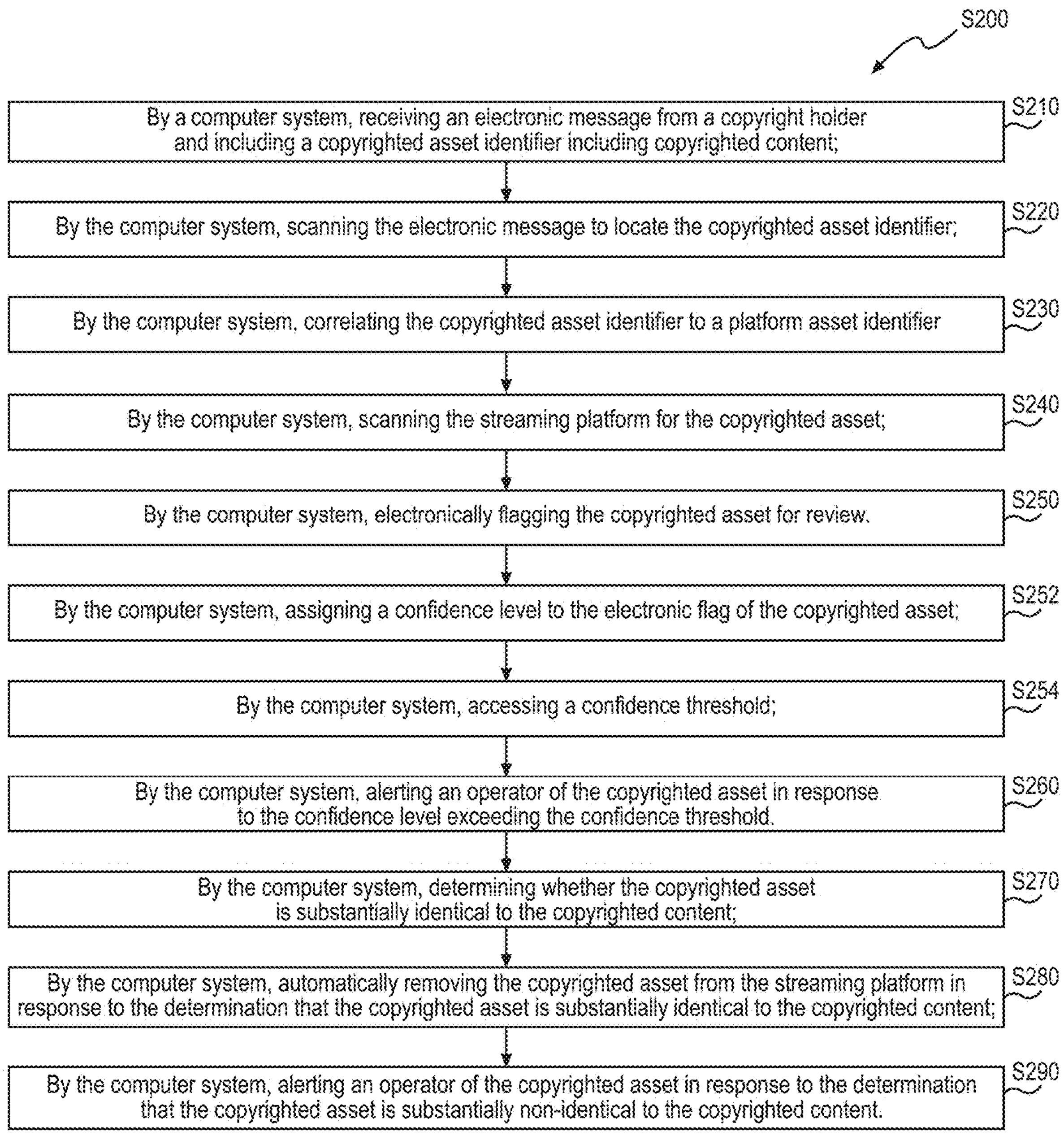
FIG. 4 is a flowchart representation of a second method.

As shown in FIG. 4, a second method S200 for removing copyrighted material from a streaming platform includes: by a computer system 100, receiving an electronic message from a copyright holder and including a copyrighted asset identifier including copyrighted content in Block S210; by the computer system 100, scanning the electronic message to locate the copyrighted asset identifier in Block S220; and by the computer system 100, correlating the copyrighted asset identifier to a platform asset identifier in Block S230. The method S100 can further include: by the computer system 100, scanning the streaming platform for the copyrighted asset in Block S240; and by the computer system 100, electronically flagging the copyrighted asset for review in Block S150.

The method S200 can also include: by the computer system 100, assigning a confidence level to the electronic flag of the copyrighted asset in Block S252; by the computer system 100, accessing a confidence threshold in Block S254; and by the computer system 100, alerting an operator of the copyrighted asset in response to the confidence level exceeding the confidence threshold in Block S260.

The method S200 can further include: by the computer system 100, determining whether the copyrighted asset is substantially similar to the copyrighted content in Block S270; and by the computer system 100, automatically removing the copyrighted asset from the streaming platform in response to the determination that the copyrighted asset is substantially similar to the copyrighted content in Block S280. The method S100 can further include: by the computer system 100, alerting an operator of the copyrighted asset in response to the determination that the copyrighted asset is substantially non-identical to the copyrighted content in Block S290.

Figure 5:
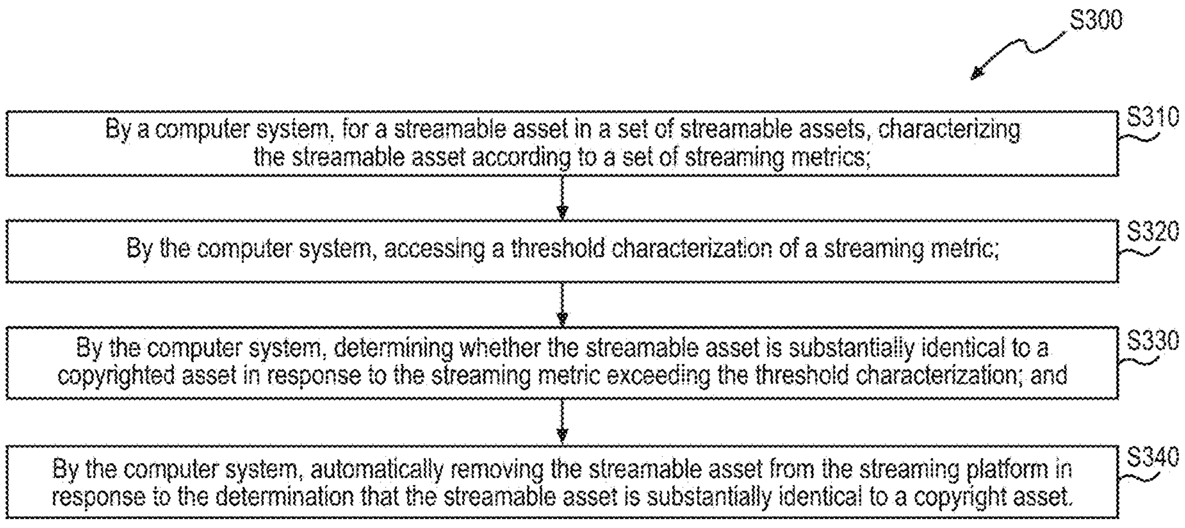
FIG. 5 is a flowchart representation of a third method.

As shown in FIG. 5, a third method S300 for removing copyrighted material from a streaming platform includes: by a computer system 100, for a streamable asset in a set of streamable assets, characterizing the streamable asset according to a set of streaming metrics in Block S310; by the computer system 100, accessing a threshold characterization of a streaming metric in Block S320; by the computer system 100, determining whether the streamable asset is substantially similar to a copyrighted asset in response to the streaming metric exceeding the threshold characterization in Block S330; and by the computer system 100, automatically removing the streamable asset from the streaming platform in response to the determination that the streamable asset is substantially similar to a copyrighted asset in Block S340.

17. Applications and Architecture

Figure 6:
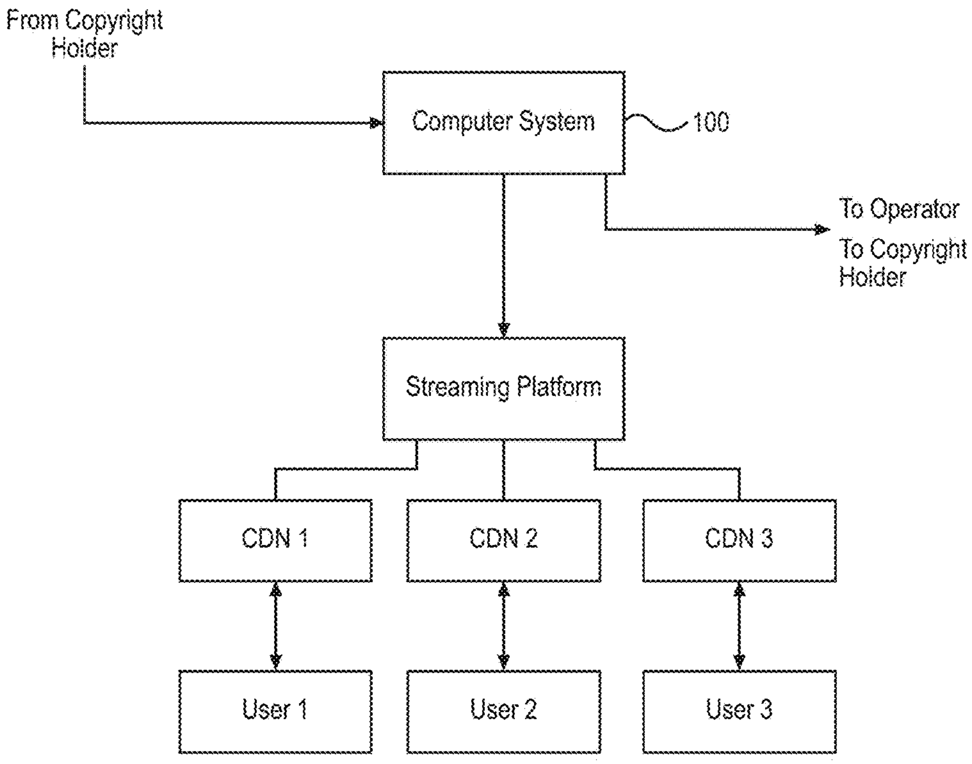
FIG. 6 is a schematic representation of a system architecture.

As shown in FIG. 6, a computer system 100 can execute Blocks of the methods S200 and S300 to autonomously or semi-autonomously identify, characterize, alert, and/or remove copyrighted audiovisual (hereafter "AV") content from a streaming platform. As shown in FIG. 6, the streaming platform can include a network of content distribution networks (hereafter "CDNs") in communication with the computer system 100 and a set of viewers and/or content creators who generate, distribute, and/or view streaming AV content transmitted through the CDNs to a user device (e.g., computer, laptop, tablet, smartphone, etc.).

Generally, the computer system 100 can execute Blocks of the method S200 to automatically respond to inquiries, notices, or complaints from copyright holders, for example notices promulgated by the copyright holders under the Digital Millennium Copyright Act (hereafter "DMCA"). The computer system 100 can be configured to: receive electronic notices pertaining to AV content streaming (or streamed) on the streaming platform, identify the AV content within the streaming platform, flag the AV content for review by an operator, and in response to operator confirmation remove the AV content from the streaming platform. Additionally, the computer system 100 can aid in the identification and confirmation process by generating a contextual frame in which the AV content is broadcast, including for example: the identity of the copyright holder; the association of the copyright holder with any prominent broadcast events; the time and date of any prominent broadcast events; and semantic or visual cues that assist in identifying the AV content vis-à-vis a claim made by the copyright holder.

In one example, the computer system 100 can function to identify improperly streamed broadcast of a sporting event by: ingesting and analyzing a context in which the streaming events are occurring; identifying and correlating the identity of the copyright holder and the event; and confirming a substantial identity between the streamable asset and the copyrighted asset. Therefore, in the case of a sporting event, the computer system 100 can correlate times and dates of potential streaming violations with inbound notices from copyright holders associated with the sporting event in order to generate a confidence level that the streamable asset is also a copyrighted asset. The computer system 100 can therefore serve alerts or notices to operators including a confidence level to assist the operator in making a determination of potential copyright misuse.

The computer system 100 can also execute Blocks of the method S300 to: automatically and preemptively identify, characterize, and remove streamable assets from the streaming platform that are potentially or probably violating rights of a copyright holder. Generally, the computer system 100 can automatically correlate contextual data (e.g., times, dates, locations) of prominent broadcast events with internal streaming platform metrics (e.g., viewers, bitrates, byterates, IP addresses, CDN usage) to inferentially determine whether streaming content is likely or probably a copyrighted asset. In one variation of the example implementation described below, the computer system 100 can function autonomously to flag and remove any offending streaming content. In another variation of the example implementation described below, the computer system 100 can function as support for a human operator and/or copyright owner by automatically tagging potentially offending streaming content, quarantining the potentially offending streaming content, and automatically generating and transmitting alerts or notices to an operator and/or copyright owner to confirm the determination of copyright abuse.

As described herein, the computer system 100 can be configured within an operating environment or network architecture to execute Blocks of the methods S200, S300. For example, an architecture can include a computer system 100 (e.g., a set of computers, network of servers, local/remote proxy servers, databases, etc.) that is configured to access, receive, ingest, configure, and/or store AV segments, for example including portions of digital video data. The computer system 100 can include and/or be connected with another set of servers that are internet-facing and associated with users, content creators, and/or viewers of streamable AV content.

18. Second Method

As shown in FIG. 4, a second method S200 for removing copyrighted material from a streaming platform includes: by a computer system 100, receiving an electronic message from a copyright holder and including a copyrighted asset identifier including copyrighted content in Block S210. In one example implementation, the computer system 100 can include: a server or set of servers configured as a streaming platform for AV content and connected with or coupled to a CDN; and an input port connection through which an electronic message can be received by the computer system 100. For example, the computer system 100 can be associated with an email address to receive inbound email messages from copyright holders that identify a copyrighted asset (e.g., a segment of creative content, such as: sound, music, video, photograph, software code) that is subject to the copyright laws of a jurisdiction.

In particular example implementations described herein, the copyrighted asset can include an AV stream that is improperly copied and broadcast through the streaming platform without the permission of the copyright holder. For example, the copyrighted asset can include a portion or substantial portion of a copyrighted broadcast of a sporting event, the rights to which are held by the organizing entity or host. In response to detecting a potential copyright violation on the streaming platform, the copyright holder can (either manually or automatically) generate and transmit an email message to the computer system 100 identifying the copyrighted asset using a unique identifier, such as for example a URL, a computer-readable watermark, digital fingerprint, hash, token, or script that uniquely identifies the copyrighted asset.

As shown in FIG. 4, the computer system 100 can execute Block S220 of the method S200 by scanning the electronic message to locate the copyrighted asset identifier. For example, the computer system 100 can include: a first module to ingest the natural language and/or machine-readable portions of the electronic message; and a second module such as a natural language processor to scan and locate the portion of the electronic message that includes the copyrighted asset identifier. For example, the computer system 100 can ingest the electronic message (e.g., an email) and then implement natural language processing techniques to identify text, phrases, or semantic queues that correspond to a copyrighted asset identifier. Example copyright asset identifiers can include: "©," "all rights reserved," "copyright," "work," "performance," "broadcast," etc. Alternatively, the electronic message can include machine readable code that corresponds to the copyrighted asset identifier, such as a URL including a token or hash that uniquely identifies the copyrighted asset as the property of the copyright holder.

As the shown in FIG. 4, the computer system 100 can execute Block S230 of the method S200 by correlating the copyrighted asset identifier to a platform asset identifier. Generally, the streaming platform can distribute AV content via a set of CDNs, and each segment of AV content can include or define an associated platform asset identifier (e.g., a header, file name, descriptor, hash, or tag) included in a URL that uniquely identifies the AV content within the streaming platform. Therefore, the computer system 100 can function to associate the copyrighted asset identifier (provided by the copyright owner) with a corresponding platform asset identifier.

As shown in FIG. 4, the computer system 100 can execute Block S240 of the method S200 by scanning the streaming platform for the copyrighted asset. As noted above, the streaming platform can include a set of databases, servers, routers, and CDNs configured for receiving, transcoding, and delivering digital AV content to a set of viewers. Generally, the streaming platform can host and stream a set of streamable files, each of which can include an identifier such as a hash or tag that functions to uniquely identify and locate the streamable file within the streaming platform. The computer system 100 can access and scan the streaming platform (or subcomponents of the streaming platform) to correlate the platform asset identifier with a set of streamable files stored and/or streaming on the streaming platform. In one variation of the example implementation, the computer system 100 can scan portions of streamable files (e.g., file manifests) to locate the platform asset identifier.

As shown in FIG. 4, the computer system 100 can execute Block S250 of the method S200 by electronically flagging the copyrighted asset for review. Generally, in response to identifying the copyrighted asset, the computer system 100 can apply an electronic tag or flag that distinguishes the streamable file as a copyrighted asset within the entire set of streamable files. For example, the computer system 100 can add an electronic flag to the platform asset identifier to distinguish a selected copyrighted asset from the set of streamable files. Alternatively or additionally, the computer system 100 can duplicate and/or move the selected copyrighted asset from a first stored location (e.g., on a first server) into a quarantine storage location (e.g., on a second server) for further review of the legitimacy of the copyright holder's claim regarding the streamable file. Generally, as described below, the computer system 100 can review the veracity of the copyright holder's claim via automated or semi-automated techniques and methods, based in part upon a confidence level associated with the veracity of the copyright holder's claim.

As shown in FIG. 4, the computer system 100 can execute Block S252 of the method S200 by assigning a confidence level to the electronic flag of the copyrighted asset. Generally, the confidence level can be reflective and/or representative of a contextual frame in which the electronic message is received at the computer system 100. For example, the contextual frame can include: a set of words, phrases, or images associated with prominent broadcast events; a list or set of copyright holders associated with the set of prominent broadcast events; sets of dates, times, broadcast channels associated with the set of prominent broadcast events; sets of website domains, websites, email addresses, and/or email domains associated with the copyright holders and/or associated with the set of prominent broadcast events, etc.

Generally, the computer system 100 can ingest, access, and/or generate the contextual frame and store it in a context module. As an illustrative example, in response to the broadcast of a fictional sportsball event, the contextual frame can include sets of words, phrases, times, dates, and/or website and/or email domains associated with the event. The computer system 100 can therefore anticipate potential copyright abuses by previously ingesting information regarding the upcoming dates, times, and semantic context of the sportsball event. Moreover, the context module can include an audiovisual machine learning module (e.g., convolutional neural network) configured to identify features within the flagged AV content, such as a green field, players wearing jerseys, a ball, a crowd, etc.

For example, the computer system 100 can implement machine learning techniques to identify distinguishing contextual features within the AV content that are congruous or incongruous with the initial copyright claim and surrounding context. Thus, if the computer system 100 identifies a series of images indicating the presence of a field, players, a ball, a crowd, etc., then the AV context is congruous with a sportsball match. If the computer system 100 identifies a series of images indicating the presence of a cat, a ball of yarn, and a puppy, then the AV content is incongruous with a sportsball match.

As shown in FIG. 4, the computer system 100 can execute Block S254 of the method S100 by accessing a confidence threshold. Generally, the confidence threshold can function as a measure of statistical confidence that the copyrighted asset referred to in the electronic message in Block S110 is a genuine or authentic copyright complaint by the copyright holder. The confidence threshold can be set and/or adjusted by an operator in response to events (e.g., large scale broadcasts, high value copyrighted content). Alternatively, the confidence threshold can be determined, set, and adjusted by the computer system 100 based on heuristic or machine learning techniques.

As shown in FIG. 4, in one variation of the example implementation, the computer system 100 can execute Block S260 of the method S200 by alerting an operator of the copyrighted asset in response to the confidence level exceeding the confidence threshold. For example, the computer system 100 can: automatically generate and transmit an electronic message, prompt, or alert to an operator indicating that a copyrighted asset has been likely identified on the streaming platform such that the operator can review the content and decide as to whether the copyrighted asset should be removed from the streaming platform. The computer system 100 can then: accept a determination from the operator regarding removal of the copyrighted asset from the streaming platform and respond accordingly.

As shown in FIG. 4, in another variation of the example implementation, the computer system 100 can execute Block S270 of the method S200 by automatically determining whether the copyrighted asset is substantially similar to the copyrighted content. The computer system 100 can execute Block S270 autonomously, with assistance from an operator, or as support to an operator in determining the degree of identity between the copyrighted asset and the copyrighted content identified by the copyright holder. For example, the computer system 100 can implement methods and techniques described above to determine with high confidence (e.g., 95% confidence) that a particular segment of streamable content is identical or substantially similar to a copyrighted asset. As noted above, the computer system 100 can calculate a confidence level that is reflective or representative of the contextual frame in which the electronic message is received at the computer system 100 as well as the features extracted from the AV content. Therefore, if the computer system 100 attaches an electronic flag to a copyrighted asset that includes a livestream of a sportsball final, the computer system 100 can further determine that the copyrighted asset is substantially similar to copyrighted content based upon the context in which the initial complaint was received in Block S210, (e.g., during the sportsball final broadcast and from a sportsball.com email domain and including images and/or features of a field, ball, players).

As shown in FIG. 4, in another variation of the example implementation, the computer system 100 can execute Block S180 of the method S100 by automatically removing the copyrighted asset from the streaming platform in response to the determination that the copyrighted asset is substantially similar to the copyrighted content. In one alternative of the variation of the example implementation, the computer system 100 can automatically remove the copyrighted asset from the streaming platform in response to a confidence level exceeding the confidence threshold by a (set or variable) quantity, (e.g., greater than 10% difference between confidence level and confidence threshold). In another alternative of the variation of the example implementation, the computer system 100 can automatically remove the copyrighted asset from the streaming platform in response to an absolute measure of the confidence level, (e.g., 95%+confidence level).

Furthermore, as shown in FIG. 4, the computer system 100 can execute Block S190 of the method S100 by alerting an operator of the copyrighted asset in response to the determination that the copyrighted asset is substantially non-identical to the copyrighted content in Block S190. Therefore, for copyrighted assets that are not automatically removed by the computer system 100 in Block S180, the computer system 100 can automatically generate and transmit an electronic message, prompt, or alert to an operator indicating that a copyrighted asset has been likely identified on the streaming platform such that the operator can review the content and decide as to whether the copyrighted asset should be removed from the streaming platform. The computer system 100 can then: accept a determination from the operator regarding removal of the copyrighted asset from the streaming platform and respond accordingly.

19. Second Method

As shown in FIG. 5, a third method S300 for removing copyrighted material from a streaming platform includes: by a computer system 100, for a streamable asset in a set of streamable assets, characterizing the streamable asset according to a set of streaming metrics in Block S310. The set of streaming metrics can include internal or external traffic data within, to, and/or from the streaming platform, for example: a platform asset identifier or set of platform asset identifiers; byte rates and/or bitrates of transcoding and/or broadcasting; a number of stream recipients; and a set of locations and/or IP addresses of stream recipients. The computer system 100 can access the set of streaming metrics at a CDN or a network of CDNs as well as a server or set of servers on the streaming platform.

Additionally, the computer system 100 can access a contextual frame or a portion of a contextual frame as described above. A portion of a contextual frame can include: sets of dates, times, broadcast channels associated with the set of prominent broadcast events; sets of website domains, websites, email addresses, and/or email domains associated with the copyright holders and/or associated with the set of prominent broadcast events, etc.

As shown in FIG. 5, the computer system 100 can execute Block S320 of the method S300 by accessing a threshold characterization of a streaming metric. A threshold characterization can include an operator-input threshold received at the computer system 100 and associated with a prominent broadcast event of interest. Alternatively, the computer system 100 can automatically generate the threshold characterization in response to the portion of the contextual frame, (e.g., in response to a known or expect increase in streaming activity due to an upcoming prominent broadcast event). For example, the threshold characterization can include a number of streaming recipients at a particular time (localized based upon IP addresses and/or CDN location) associated with the prominent broadcast event. Thus, if the sportsball world championship is set for 1700 hours GMT, then the threshold characterization can include a number of streaming recipients at 1700 GMT. Alternatively, the threshold characterization can include a bitrate or byterate of traffic being transcoded and/or broadcast through the streaming platform at 1700 GMT.

As shown in FIG. 5, the computer system 100 can execute Block S330 of the method S300 by determining whether the streamable asset is substantially similar to a copyrighted asset in response to the streaming metric exceeding the threshold characterization. In one variation of the example implementation, the computer system 100 can inferentially determine that the streamable asset is substantially similar to the copyrighted asset based solely upon the streaming metric exceeding the threshold characterization. For example, if the threshold characterization is one hundred concurrent stream recipients for a single platform asset at a time associated with a prominent broadcast event, the computer system 100 can conclude that that concurrent stream recipients are, to a high degree of certainty, improperly streaming the copyrighted prominent broadcast event.

Additionally or alternatively, in this variation of the example implementation, the computer system 100 can weight or unweight an inferential conclusion based upon a location and/or IP address associated with viewers of the stream and/or the location(s) of individual servers with the CDN distributing the AV content. As some locations or jurisdictions are associated with a high probability of active infringement (e.g., due to lack of enforcement within the jurisdiction, socioeconomic status of the location), the computer system 100 can positively weight a high proportion of streaming recipients and/or CDNs located in these jurisdictions. Conversely, in jurisdictions associated with a lower probability of active infringement, the computer system 100 can negatively weight (or unweight) a high proportion of streaming recipients and/or CDNs located in these jurisdictions.

In another variation of the example implementation, the computer system 100 can intermediately determine that the streamable asset is substantially similar to the copyrighted asset based in part upon the streaming metric exceeding the threshold characterization. In this variation of the example implementation, the computer system 100 can execute methods and techniques described above to generate an inferential conclusion, and then execute additional methods or techniques described above to confirm the identity of the streaming content as a copyrighted asset. For example, the computer system 100 can determine congruity between the streamable asset and the intermediate determination that the streamable asset is substantially similar to the copyrighted asset. As noted above, in determining a level of congruity or incongruity, the computer system 100 can implement machine learning techniques to identify distinguishing contextual features within the streamable asset that are congruous or incongruous with the initial copyright claim and surrounding context. Thus, if the computer system 100 identifies a series of images indicating the presence of a field, players, a ball, a crowd, etc., then the streamable asset is congruous with a sportsball match and therefore the copyrighted asset. If the computer system 100 identifies a series of images indicating the presence of a cat, a ball of yarn, and a puppy, then the streamable asset is incongruous with a sportsball match and unlikely substantially similar to the copyrighted asset.

As shown in FIG. 5, the computer system 100 can execute Block S340 of the method S300 by automatically removing the streamable asset from the streaming platform in response to the determination that the streamable asset is substantially similar to a copyrighted asset. In one variation of the example implementation, the computer system 100 can: block access to the streamable asset from outside the streaming platform, tag or flag the streamable asset for review, and generate and transmit an alert, prompt, or notice to an operator to confirm or disconfirm deletion of the streamable asset. Alternatively, the computer system 100 can further archive and/or save a copy of the streamable asset (or a portion of the streamable asset) for further review and/or confirmation that the removal was appropriate.

In another variation of the example implementation, the computer system 100 can block access to the streamable asset from outside the streaming platform, tag or flag the streamable asset for review, and generate and transmit an alert, prompt, or notice to a copyright holder to confirm or disconfirm deletion of the streamable asset. For example, the computer system 100 can: execute Blocks of the method S300 described above; block access to the streamable asset from outside the streaming platform; tag the streamable asset for review; optionally generate and transmit an alert to a copyright holder (e.g., copyright@sportsball.com); and embed a link and/or permissions within the alert to the copyright holder that grant the copyright holder access into the streaming platform to confirm or disconfirm the identity of the streamable asset. Therefore, the computer system 100 can automatically and proactively identify and quarantine/remove streamable assets and generate and transmit alerts (either externally or internally) to an operator and/or a copyright holder to confirm or disconfirm the substantial identity between the streamable asset and the copyrighted asset.

In yet another variation of the example implementation, the computer system can: identify a streaming platform user based on the source of the streamable asset and remove the streaming platform user from the streaming platform by automatically revoking her streaming platform credentials and/or blocking access via any IP address(es) associated with the streaming platform user.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method comprising:

monitoring a set of streaming metrics of a video stream associated with an asset;

identifying a first streaming metric, in the set of streaming metrics, exceeding a threshold metric;

accessing a conflict log comprising a set of flagged assets in response to a first streaming metric, in the set of streaming metrics, exceeding a threshold metric;

detecting absence of the asset in the conflict log;

in response to absence of the asset in the conflict log:

extracting a set of image frames from the video stream;

executing an image classification model on the set of image frames to derive a set of derived tags characterizing the set of image frames;

retrieving a set of target tags related to a content type of the video stream;

calculating a match score for the video stream based on a similarity between the set of derived tags and the set of target tags;

generating a prompt to review the video stream in response to the match score exceeding a threshold score;

serving the prompt to an operator;

receiving an abuse confirmation for the video stream from the operator;

in response to receiving the abuse confirmation for the video stream from the operator:

generating a notification descriptive of the abuse confirmation;

transmitting the notification to the asset; and automatically removing the video stream from a video streaming platform.

2. The method of claim 1:

wherein generating the prompt to review the video stream comprises generating a set of instructions for the operator to confirm presence of copyrighted content in the video stream based the set of target tags; and further comprising receiving the abuse confirmation indicating presence of copyrighted content in the video stream from the operator.

3. The method of claim 1:

further comprising accessing a risk score associated with the asset;

wherein extracting the set of image frames from the video stream comprises extracting the set of image frames, from the video stream, according to an image extraction frequency based on the risk score associated with the asset; and wherein calculating the match score for the video stream comprises calculating the match score based on a count of matches between the set of derived tags and the set of target tags.

4. The method of claim 3, further comprising:

during a first time period:

accessing an asset profile for the asset; and calculating the risk score of the asset based on the asset profile; and during a second time period:

detecting a change in profile attributes associated with the asset profile; and updating the risk score of the asset based on the change in profile attributes.

5. The method of claim 3, further comprising, deactivating the asset profile associated with the asset in response to:

the risk score of the asset exceeding a threshold risk score; and receiving the abuse confirmation for the video stream from the operator.

6. The method of claim 1:

wherein monitoring the set of streaming metrics comprises accessing a current count of views of the video stream; and wherein accessing the conflict log comprises:

accessing the threshold metric comprising a concurrent view count threshold; and accessing the conflict log in response to the current count of views of the video stream exceeding the concurrent view count threshold.

7. The method of claim 1, further comprising:

monitoring a second set of streaming metrics for a second video stream, associated with the asset, on the video platform;

identifying a second streaming metric, in the second set of streaming metrics, exceeding the threshold metric;

in response to the second streaming metric, in the second set of streaming metrics, exceeding the threshold metric:

extracting a second set of image frames from the second video stream;

executing the image classification model to derive a second set of derived tags characterizing the second set of image frames;

retrieving a second set of target tags related to a second content type of the second video stream;

calculating a second match score for the second video stream based on a second similarity between the second set of derived tags and the second set of target tags;

identifying that the second match score exceeds the threshold score; and in response to the second match score exceeding the threshold score:

automatically removing the second video stream from the video streaming platform; and automatically deactivating the asset on the video platform.

8. The method of claim 1, further comprising:

monitoring a second set of streaming metrics for a second video stream, associated with a second asset, on the video platform;

accessing the conflict log in response to a second streaming metric, in the second set of streaming metrics, exceeding the threshold metric;

identifying presence of the second asset in the conflict log; and in response to presence of the second asset in the conflict log, automatically deactivating the second asset on the video streaming platform.

9. A method comprising:

identifying an asset associated with a video stream of a first streaming event on a video streaming platform;

accessing a set of characteristics for the asset;

calculating a risk score of the asset based on the set of characteristics;

monitoring a first viewership metric for the first streaming event during a first time window;

accessing a conflict log in response to the first viewership metric for the first streaming event exceeding a first threshold metric during the first time window;

identifying absence of the asset in the conflict log;

in response to absence of the asset in the conflict log:

extracting a set of image frames from the video stream according to an image extraction frequency based on the risk score of the asset;

executing an image classification model on the set of image frames to derive a set of derived tags:

characterizing the set of image frames; and associated with the image classification model;

retrieving a set of target concepts related to a content type of the video stream;

calculating a match score based on the set of derived tags and the set of target concepts;

delivering the video stream to an interface for manual abuse confirmation in response to the match score exceeding a threshold score; and automatically removing the video stream from the video streaming platform in response to receiving confirmation of copyrighted content in the video stream.

10. The method of claim 9, further comprising, in response to receiving confirmation of copyrighted content in the video stream:

generating a notification descriptive of the abuse confirmation and removal of the video stream; and transmitting the notification to the asset.

11. The method of claim 9, further comprising:

identifying a second asset associated with a second video stream of a second streaming event on the video streaming platform;

accessing a second asset profile for the second asset;

calculating a second risk score of the second asset based on the second asset profile;

monitoring a second viewership metric for the second streaming event;

accessing the conflict log in response to the second viewership metric for the second streaming event exceeding a second threshold metric; and automatically deactivating the second asset profile of the second asset on the video streaming platform in response to presence of the second asset in the conflict log.

12. The method of claim 9, wherein calculating the risk score of the asset comprises calculating the risk score of the asset:

during an onboarding period of the asset to the video streaming platform; and based on likelihood of abuse of audiovisual content by the asset via the video streaming platform derived from the set of characteristics.

13. The method of claim 9:

wherein monitoring the first viewership metric comprises accessing a total count of views of the video stream; and wherein accessing the conflict log comprises:

accessing the threshold metric comprising a total view count threshold; and accessing the conflict log in response to the total count of views of the video stream exceeding the view count threshold.

14. The method of claim 9, wherein calculating the match score for the video stream comprises calculating the match score based on a count of matches between the set of derived tags and the set of target concepts.

15. The method of claim 9, further comprising:

accessing a set of uniform resource locators associated with the video streaming platform and streaming the video stream;

receiving confirmation of copyrighted content in the video stream; and in response to receiving confirmation of copyrighted content in the video stream, deactivating the set of uniform resource locators.

16. The method of claim 9, wherein identifying the asset associated with the video stream comprises identifying the asset associated with the video stream in response to receiving a notice reporting the first streaming event on the video streaming platform.

17. A method comprising:

identifying an asset associated with a streaming event on a video streaming platform;

monitoring a set of viewership metrics for the streaming event;

retrieving a risk score of the asset in response to a first viewership metric, in the set of viewership metrics, for the streaming event exceeding a threshold metric;

identifying the risk score exceeding a threshold risk score;

in response to the risk score exceeding the threshold risk score, extracting a set of data samples from the streaming event;

annotating the set of data samples with a set of derived tags describing concepts exhibited in the set of data samples;

retrieving a set of target tags related to a content type of the streaming event;

calculating a match score based on similarity between the set of derived tags and the set of target tags;

delivering the set of data samples and the set of derived tags to an interface for manual abuse confirmation in response to the match score exceeding a threshold score;

receiving manual confirmation of copyrighted content in the streaming event;

in response to receiving manual confirmation of copyrighted content in the streaming event:

generating a notification to remove the streaming event from the video streaming platform within a first time period; and transmitting the notification to the asset;

identifying failure to remove the streaming event from the video streaming platform within the first time period; and in response to failure to remove the streaming event from the video streaming platform within the first time period, automatically removing the streaming event from the video streaming platform.

18. The method of claim 17:

wherein extracting the set of data streams from the streaming event comprises extracting the set of data streams from the streaming event according to a data extraction frequency based on the risk score associated with the asset; and wherein calculating the match score comprises calculating the match score based on a count of matches between the set of derived tags and the set of target tags.

19. The method of claim 17, further comprising:

detecting a change in a first characteristic associated with the asset; and updating the risk score of the asset according to the change in the first characteristic, the risk score indicative of legitimacy of the asset.

20. The method of claim 17, further comprising, in response to the risk score of the asset exceeding a threshold risk score and in response to detecting failure to remove the streaming event within the first time period:

automatically removing the streaming event from the video streaming platform; and automatically deactivating the asset on video streaming platform.

* * * * *